United States Patent [15] 3,636,534

Hibi et al. [45] Jan. 18, 1972

[54] WRITE METHOD OF A MAGNETIC WIRE MEMORY

[72] Inventors: Susumu Hibi, Yokohama; Hideo Fujiwara, Tachikawa-shi, both of Japan

[73] Assignee: Hitachi, Ltd., Tokyo, Japan

[22] Filed: Nov. 18, 1969

[21] Appl. No.: 877,796

[30] Foreign Application Priority Data

Nov. 25, 1968 Japan....................................43/85597

[52] U.S. Cl. ........................................................340/174 TF
[51] Int. Cl. ...........................................................G11b 5/00
[58] Field of Search.......340/174 R, 174 M, 174 TF, 174 PW

[56] References Cited

UNITED STATES PATENTS 3,441,916 4/1969 Motsushita et al. ...............340/174 M
3,493,945 2/1970 Semienko..........................340/174 M
3,524,171 8/1970 Guttroff et al.....................340/174 M

*Primary Examiner*—Daryl W. Cook
*Attorney*—Craig, Antonelli and Hill

[57] ABSTRACT

In a thin film magnetic wire memory device which is employed as a memory for the read-only use, a writing method characterized by the steps of making a digit current (pulse) flow in the magnetic wires in which an information is to be written, making a word driving current flow through only the necessary ones of the word driving lines during the duration of said digit current thereby to write the information "1" (or "0") along said magnetic lines, next reversing the polarity of the digit current, making a word driving current flow through the other necessary ones of the word driving lines during the duration of said digit current thereby to write the information "0" (or "1"), whereby the information is written for each magnetic wire.

5 Claims, 7 Drawing Figures

INVENTORS

SUSUMU HIBI and HIDEO FUJIWARA

BY
Craig, Antonelli, Stewart & Hill
ATTORNEYS

INVENTORS

SUSUMU HIBI and HIDEO FUJIWARA

BY Craig, Antonelli, Stewart & Hill

ATTORNEYS

WRITE METHOD OF A MAGNETIC WIRE MEMORY

The present invention relates to a method for writing information in which a nondestructive readout memory made of thin film magnetic wires is employed as a memory for the read-only use.

In order to understand the present invention an explanation will first be made of a memory element using thin film magnetic wires and its memory operation. This memory element is formed by arranging thin film magnetic wires (hereafter abbreviated as magnetic wires) made of a core conductor such as a copper wire coated with a magnetic thin film such as permalloy in parallel with one another and disposing word-driving wires perpendicularly to and electrically insulated from these magnetic wires.

The invention will be explained with reference to the accompanying drawings, in which.

Figure 3A:
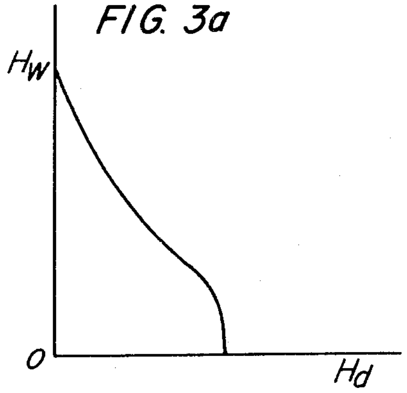
Figure 3B:
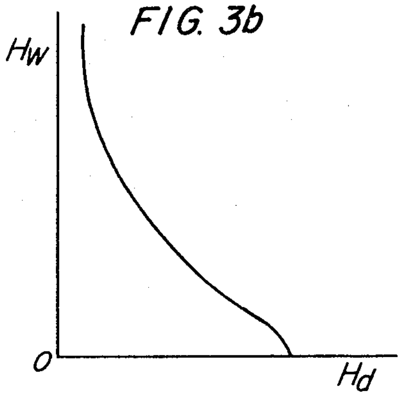

FIGS. 3*a* and 3*b* are curves showing the switching threshold for explaining the nondestructive readout system.

Figure 4:
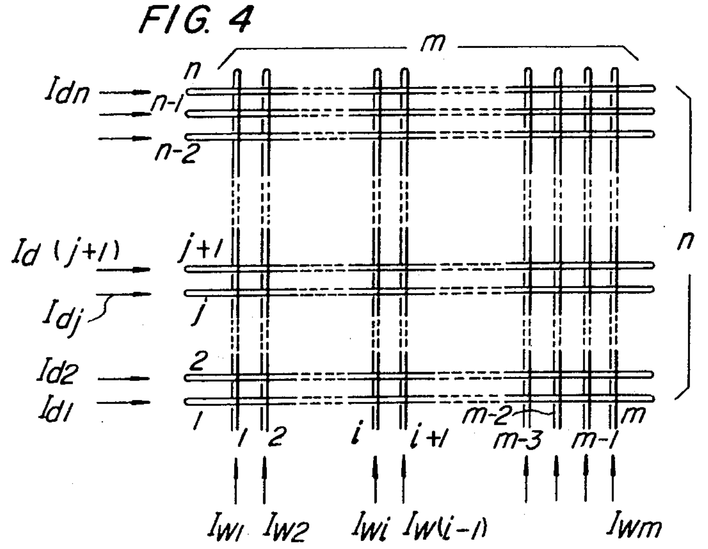

FIG. 4 shows a schematic diagram of a memory matrix having *m x n* information storage points.

Figure 5:
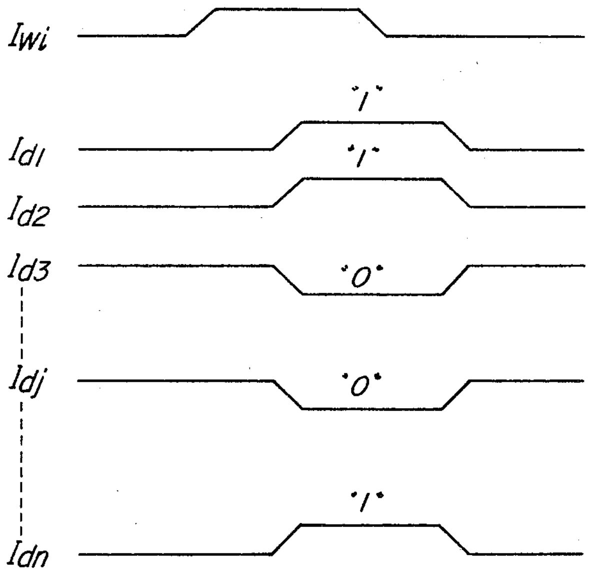

FIG. 5 shows waveforms for explaining the conventional method of writing information in the memory matrix as shown in FIG. 4.

Figure 6:
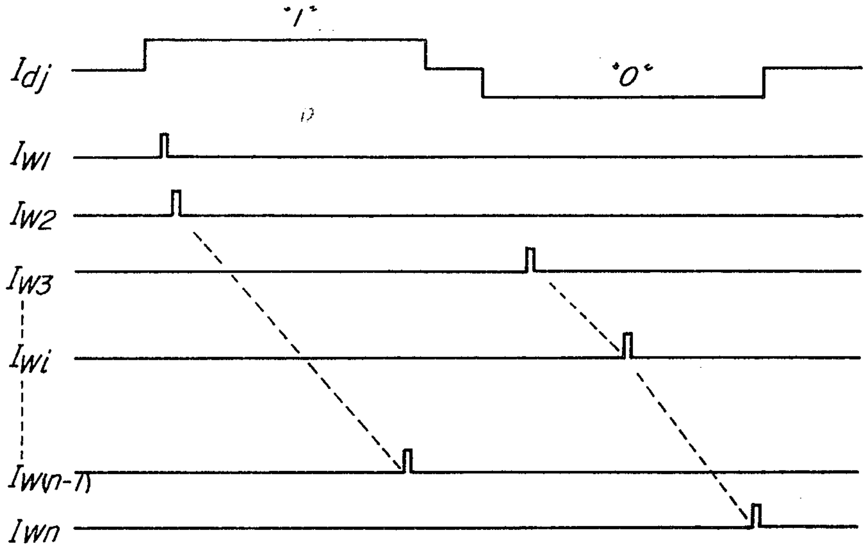

FIG. 6 shows waveforms for explaining the inventive method of writing information in the memory matrix as shown in FIG. 4.

Figure 1:
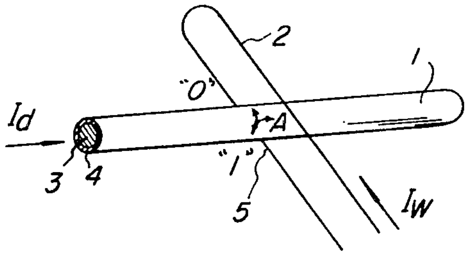
FIG. 1 is a schematic diagram showing the operating principle of a memory element using magnetic thin film.
Figure 2:
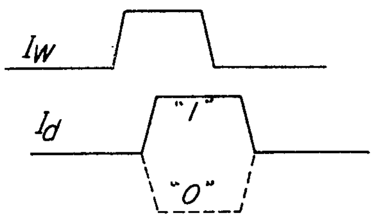
FIG. 2 shows the waveforms for explaining the relationship between the digit current and the word-driving current when information is written.

In FIG. 1, one of the intersections between the magnetic wires and the word-driving lines is shown. The magnetic wire 1 is formed by depositing a thin magnetic film 4 on the core 3. Numeral 2 is a word-driving line. The intersection 5 forms a memory element. The axis of easy magnetization of the magnetic wire 1 is usually in the peripheral direction. In this case, in the normal state (without a magnetic field) the direction of magnetization is along the axis of easy magnetization of either "1" or "0." In FIG. 1 when a word-driving current (pulse) $I_w$ is applied to the word-driving line 2, the direction of magnetization changes from the peripheral direction to the axis of hard magnetization as indicated by the arrow A. In the presence of the current $I_w$, when a positive or a negative digit current (pulse) $I_d$ is applied to the magnetic line 1 and next the current $I_w$ is cutoff followed by the cutting-off of current $I_d$, the direction of magnetization is set along the axis of easy magnetization of "1" or "0" in accordance with the polarity of the current $I_d$. Thus, information "1" or "0" is written. The relation between current $I_w$ and $I_d$ is as shown in FIG. 2.

In order to readout the message thus written the following process is followed. The word-driving current $I_w$ is made to flow. The magnetization written in the peripheral direction of "1" or "0" then orientates along the axis of hard magnetization as indicated by the arrow A, whereby a positive or a negative electric potential appears in the magnetic line. This output signal is read out through the use of an amplifier circuit or a level discriminating circuit.

As described above, by the magnetic field $H_d$ in the magnetic thin film due to the digit current $I_d$ and by the magnetic field $H_w$ due to the word-driving current $I_w$ the setting of information is performed. It is necessary here that $H_d$ and $H_w$ exceed a certain constant. The setting of the information is determined by the direction of magnetization in the magnetic thin film. The switching is only effected if the sum of the fields $H_d$ and $H_w$ exceeds the threshold value. An illustrative example of a switching threshold curve is shown in FIG. 3*a*, and another example in FIG. 3*b*. If the values of the digit current $I_d$ and the word-driving current $I_w$ are suitably selected such that the magnetization is switched only by the sum of $H_d$ and $H_w$ and not by $H_d$ or $H_w$ alone, nondestructive readout becomes possible. It is seen that for the nondestructive readout the switching threshold shown in FIG. 3*b* has a wider range than that shown in FIG. 3*a*.

Although it is so designed that the magnetization is not reversed by either the digit current $I_d$ or the word-driving current $I_w$ alone, so long as they are within the threshold curve shown in FIG. 3*a* or FIG. 3*b*, a repetition of driving by these currents gradually causes a phenomenon known as "creep." This is a serious phenomenon as it causes a gradual vanishing of the memory. The creep phenomenon is significantly caused by a numerous repetition of driving by digit currents $I_d$ or the alternate driving by the digit current $I_d$ and the word-driving current $I_w$, but not by the word-driving current $I_w$ alone, even if the word driving is repeated.

In a memory device which is employed as a memory for the read-only use, the writing of messages is made at particular times separated by a relatively long period from one another. Between these particular times only the reading of the information is carried out. Because of the creep phenomenon the use of a nondestructive readout system with magnetic wires in such a device presents the danger of a loss of information.

For example, let us consider the conventional method for writing information in an *m x n* memory matrix which is formed by *m* word-driving lines and a magnetic lines as shown in FIG. 4. When the currents $I_{wi}$ and $I_{dj}$ are made to flow through the *i*th word-driving line and *j*th magnetic line respectively in such a manner as shown in FIG. 2, information by $I_{dj}$ is written in the intersection between these lines. Usually the digit currents are made to flow concurrently so that all the intersections on the *i*th word-driving line are simultaneously written, each digit current being for example as shown in FIG. 5. When the *i*th word is written, the intersections on the other word-driving lines receive only the digit current. When all the intersections in the *m x n* matrix are to be written, the worst storage portion (intersection) receives an interference of *m*–1 digit current. Thus, the possibility arises that the interference of the digit current causes creep phenomenon, with a great danger of losing information before readout is repeatedly carried out.

The present invention obviates such a danger as the loss of information because of creep phenomenon, and provides a stable memory device which is employed as a memory for the read-only use.

The above-mentioned creep phenomenon is ready to occur by the application of a numeral repetition of digit currents $I_d$, but not by the word-driving current $I_w$ alone, no matter how many times it is repeated. Therefore, it is desirable to avoid the interference of the digit current $I_d$ as much as possible while writing. By doing so, the digit current $I_d$ does not appear while reading out and thus stable information is obtained. In the conventional method of information writing the information on a one word-driving line is simultaneously written i.e., the information is written for each word-driving line, whereas in the method of this invention they are written for each magnetic line. For example, let us assume that the information "1" and "0" are written according as the digit current is positive or negative respectively. In FIG. 4 the information "1" is written by making a positive digit current $I_{dj}$ to flow through the *j*th magnetic line and next a word-driving current $I_w$ flows through the word-driving line in which the information "1" is to be written during the duration of the digit current $I_{dj}$. Thereafter the information "0" is written by making a negative digit current $I_{dj}$ flow through the *j*th magnetic line and next a word-driving current $I_w$ through the word-driving line in which the information "0" is to be written during the duration of the digit current $I_{dj}$. In this manner the writing in the *j*th magnetic line is completed. Next, the writing in the (*j*+1) magnetic line is performed, and so forth. Thus, the writing is done from the first to the *n*th magnetic line as shown in FIG. 6. In this example, during the duration of the long digit current pulse for "1" in the *j*th magnetic line the currents $I_{w1}$, $I_{w2}$,...$I_{wn-1}$ are made to flow in a time sharing manner, whereby the information "1" is written in the intersections between the *j*th magnetic line and the first, second...and *n*–1th word-driving lines. Next, the digit current $I_{dj}$ is reversed to the "0" side and synchronized with it the word-driving current $I_{w3}$...$I_{wn}$ for the information "0" are made to flow in the time sharing manner. Although in FIG. 6 the writing operation is performed by the time sharing scanning under the existence of only one word-driving current pulse, it is possible to make the word-driving current simultaneously flow through a plurality of word-driving current or to make the word-driving currents flow through all the word-driving lines of either "1" or "0" simultaneously so that the writing is effected by driving the current twice.

According to another method, first the information "1" (or "0") is written in all the memory points followed by the inversion of the digit current. Thereafter the word-driving current is made to flow only through the word-driving lines in which the information "0" (or "1") is to be written during the duration of the digit current. In these writing methods, since the digit current pulse flows only once in the positive and negative directions through the magnetic lines the writing being done by either one of the positive or negative current, the interference of the digit current appears only once even under the worst condition. It has been confirmed experimentally that the creep phenomenon scarcely appears if the interference of the digit current occurs only once.

As described above, according to the writing method of the present invention since the interference of the digit current during the writing of information appears only once even under worst conditions, no loss of the written information due to creep phenomenon occurs. Therefore, the use of the present method makes it possible to realize a memory device for the read-only use of readout of a nondestructive type in a stable form.

What we claim is:

1. In a thin film magnetic wire memory device which is employed as a memory for the read-only use, a writing method characterized by the steps of making a digit current (pulse) flow in the magnetic wires in which an information is to be written, making a word-driving current flow through only the necessary ones of the word-driving lines during the duration of said digit current thereby to write the information "1" (or "0" ) along said magnetic lines, next reversing the polarity of the digit current, making a word-driving current flow through the other necessary ones of the word-driving lines during the duration of said digit current thereby to write the information "0" (or "1"), whereby the information is written for each magnetic wire.

2. In a thin film magnetic wire memory device which is employed as a memory for the read-only use, a writing method characterized by the steps of making a digit current (pulse) flow in the magnetic wires in which information is to be written, making a word-driving current flow through all the word-driving lines during the duration of said digit current thereby to write the information "1" (or "0") along said magnetic lines, next reversing the polarity of the digit current, making a word-driving current flow through the necessary ones of the word-driving lines during the duration of said digit current thereby to write the information "0" (or "1"), whereby the information is written for each magnetic line.

3. A method of writing information in a thin film magnetic memory device, having magnetic wires and driving lines therefor, employed as a read-only memory, comprising the steps of:

applying a digit current pulse of a first polarity in the magnetic wires in which information is to be written;

applying a word-driving current through only the necessary ones of the word-driving lines during the duration of said digit current pulse, to thereby write information indicating a first state along said magnetic wires;

subsequently, applying a digit current pulse of a second polarity opposite to said first polarity in said magnetic wires; and applying a word-driving current through other necessary ones of the word-driving lines during the duration of said opposite polarity digit current pulse, to thereby write information indicating a second state along said magnetic wire, whereby information in both said first and second states is written along said magnetic wires.

4. A method according to claim 3, wherein said steps of applying word-driving currents comprise the steps of applying respective word-driving currents to said word-driving lines in a time-shared sequence during the duration of each digit current pulse.

5. A method according to claim 3, wherein said step of applying word-driving currents comprises the steps of applying said word-driving currents to said necessary ones of said word-driving lines simultaneously for the duration of said digit current of a first polarity, and subsequently applying word-driving currents to said other ones of said word-driving lines simultaneously for the duration of said digit current of said second polarity.

* * * * *